United States Patent
Yuan

(10) Patent No.: US 7,323,017 B2
(45) Date of Patent: Jan. 29, 2008

(54) NITRIDED VALVE METAL MATERIAL AND METHOD OF MAKING SAME

(75) Inventor: Shi Yuan, West Chester, PA (US)

(73) Assignee: Cabot Corporation, Boston, MA (US)

( * ) Notice: Subject to any disclaimer, the term of this patent is extended or adjusted under 35 U.S.C. 154(b) by 0 days.

(21) Appl. No.: 11/602,150

(22) Filed: Nov. 20, 2006

(65) Prior Publication Data

US 2007/0064357 A1    Mar. 22, 2007

Related U.S. Application Data

(62) Division of application No. 10/894,535, filed on Jul. 20, 2004, now Pat. No. 7,142,409.

(60) Provisional application No. 60/490,494, filed on Jul. 28, 2003.

(51) Int. Cl.
*H01G 9/00*    (2006.01)

(52) U.S. Cl. ............... 29/25.03; 257/E21.008

(58) Field of Classification Search .............. None
See application file for complete search history.

(56) References Cited

U.S. PATENT DOCUMENTS

| | | | |
|---|---|---|---|
| 4,517,727 A | 5/1985 | Shimizu et al. | |
| 5,911,857 A | 6/1999 | Kim | |
| 6,051,044 A | 4/2000 | Fife | |
| 6,075,691 A | 6/2000 | Duenas et al. | |
| 6,105,374 A * | 8/2000 | Kamody | ................ 62/64 |
| 6,258,653 B1 | 7/2001 | Chew et al. | |
| 6,268,620 B1 | 7/2001 | Ouellet et al. | |
| 6,375,704 B1 | 4/2002 | Habecker et al. | |
| 6,400,556 B1 | 6/2002 | Masuda et al. | |
| 6,420,043 B1 | 7/2002 | Fife et al. | |
| 6,479,012 B2 | 11/2002 | Rao | |
| 6,515,846 B1 | 2/2003 | Tripp | |
| 6,529,367 B1 | 3/2003 | Naito et al. | |
| 6,545,858 B1 * | 4/2003 | Naito et al. | ................ 361/510 |
| 6,576,038 B1 | 6/2003 | Rao | |
| 2004/0028922 A1 | 2/2004 | Reichert et al. | |

FOREIGN PATENT DOCUMENTS

| | | |
|---|---|---|
| JP | 5-13282 | 1/1993 |
| JP | 10-130759 | 5/1998 |

OTHER PUBLICATIONS

International Search Report and Written Opinion for PCT/US2004/024144 dated Dec. 3, 2004.
Northeast Coating Technologies, www.northeastcoating.com/PlasmaNitriding_1.htm.

(Continued)

*Primary Examiner*—Michael Lebentritt
*Assistant Examiner*—Kyoung Lee

(57) ABSTRACT

Valve metal material, including a valve metal, a nitride layer located on the valve metal, and an oxide layer located on the nitride layer is described. Methods of forming such a valve metal material are also described. The method includes forming an oxide layer onto the valve metal and then forming a nitride layer between the oxide layer and the valve metal.

14 Claims, 1 Drawing Sheet

OTHER PUBLICATIONS

Northeast Coating Technologies, www.northeastcoating.com/PlasmaProcess_1.htm.
Northeast Coating Technologies, www.northeastcoating.com/PlasmavsGas_1.htm.
Northeast Coating Technologies, www.northeastcoating.com/PlasmaEng_1.htm.
Gill, "Glossary of terms used in the tantalum industry," AVX Technical Information, www.avxcorp.com, no date.
Gill, "Basic tantalum capacitor technology," AVX Technical Information, www.avxcorp.com, no date.

* cited by examiner

NITRIDED VALVE METAL MATERIAL AND METHOD OF MAKING SAME

This application is a divisional of U.S. patent application Ser. No. 10/894,535, filed Jul. 20, 2004 now U.S. Pat. No. 7,142,409, which in turn claims the benefit under 35 U.S.C. §119(e) of prior U.S. Provisional Patent Application No. 60/490,494 filed Jul. 28, 2003, which is incorporated in its entirety by reference herein.

BACKGROUND OF THE INVENTION

The present invention relates to valve metals. More particularly, the present invention relates to methods of nitriding valve metal having an oxide layer, and to the nitrided valve metal material so produced.

Capacitors in general, and tantalum capacitors in particular, have been a major contributor to the miniaturization of electronic circuitry. Tantalum capacitors also operate over a wide temperature range and have good shelf life, long service, and are useful in extreme environments. Tantalum capacitors are typically manufactured by compressing tantalum powder into a pellet and then sintering the pellet to form a porous body. The porous body is then anodized in a suitable electrolyte to form a continuous dielectric oxide film on the sintered body. The pores are filled with an electrolyte or counter electrode and a lead wire is attached to form the capacitor.

The performance characteristics of capacitors or electrodes formed from capacitor grade powders are expressed in terms of specific charge and electrical current leakage. The specific charge is a measure of electrical charge capacity of the capacitor and is usually proportional to the surface area of the powder as a sintered and anodized pellet. The electrical leakage is an indication of how well the capacitor holds the specific charge. Capacitors with improved electrical leakage characteristics are recognized as having higher reliability.

It is well known that the performance characteristics of finished capacitors are affected by the chemical and physical characteristics of the base material used to make the capacitors. Base powders can develop undesirable crystalline-like flaws in the dielectric film during sintering and anodic oxidation. The flaws allow current to pass through the dielectric, producing parts that exhibit excessive electrical leakage and premature failure. The likelihood of flaw formation increases for high voltage capacitors where anodization voltages of 100 V or higher are used.

Various attempts have been made to improve the performance characteristics of finished capacitors by reacting small quantities of modifying agents to the base material. A range of additives or "dopants" have been used including nitrogen, silicon, phosphorous, boron, carbon, and sulfur. Attempts also specifically include forming a uniform tantalum nitride film on powder by subjecting the base powder material to ammonia gas and mixtures of nitrogen or ammonia with an inert gas such as argon. Alternatively, the base powder material may be exposed to a salt bath consisting of $NaCN$, $NaCO_3$, $BaCl_2$, and $KCl$. The doped base powder material then can be pressed into anodes and sintered. The problem with this process of doping the powders is that a minimum effect is achieved, and when the powders are pressed or otherwise formed into an anode and used as a capacitor, the dielectric layer still diffuses into the metal anode causing destabilization of the anode.

Accordingly, a need exists for a method of improving chemical and physical characteristics of base material used to make the capacitors.

SUMMARY OF THE PRESENT INVENTION

It is therefore a feature of the present invention to provide a valve metal material having a stabilized valve metal/oxide layer interface.

Another feature of the present invention is to provide a nitride blocking layer in a valve metal material for use in forming an improved electrolytic capacitor anode.

A further feature of the present invention is to provide a capacitor made from a valve metal material having a nitride alloy layer.

Another further feature of the present invention is to provide a tantalum nitride layer between tantalum and a tantalum pentoxide layer.

Additional features and advantages of the present invention will be set forth in part in the description that follows, and in part will be apparent from the description, or may be learned by practice of the present invention. The objectives and other advantages of the present invention will be realized and attained by means of the elements and combinations particularly pointed out in the description and appended claims.

To achieve these and other advantages, and in accordance with the purposes of the present invention, as embodied and broadly described herein, the present invention relates to a valve metal material that includes a valve metal, a nitride layer located on the valve metal, and an oxide layer located on the nitride layer.

The present invention also relates to a method of forming the nitride layer on the valve metal, such as by plasma nitriding a valve metal having an oxide layer.

It is to be understood that both the foregoing general description and the following detailed description are exemplary and explanatory only and are intended to provide a further explanation of the present invention, as claimed.

The accompanying drawings, which are incorporated in and constitute a part of this application, illustrate various aspects of the present invention and together with the description, serve to explain some of the principles of the present invention.

DETAILED DESCRIPTION OF THE PRESENT INVENTION

Figure 1:
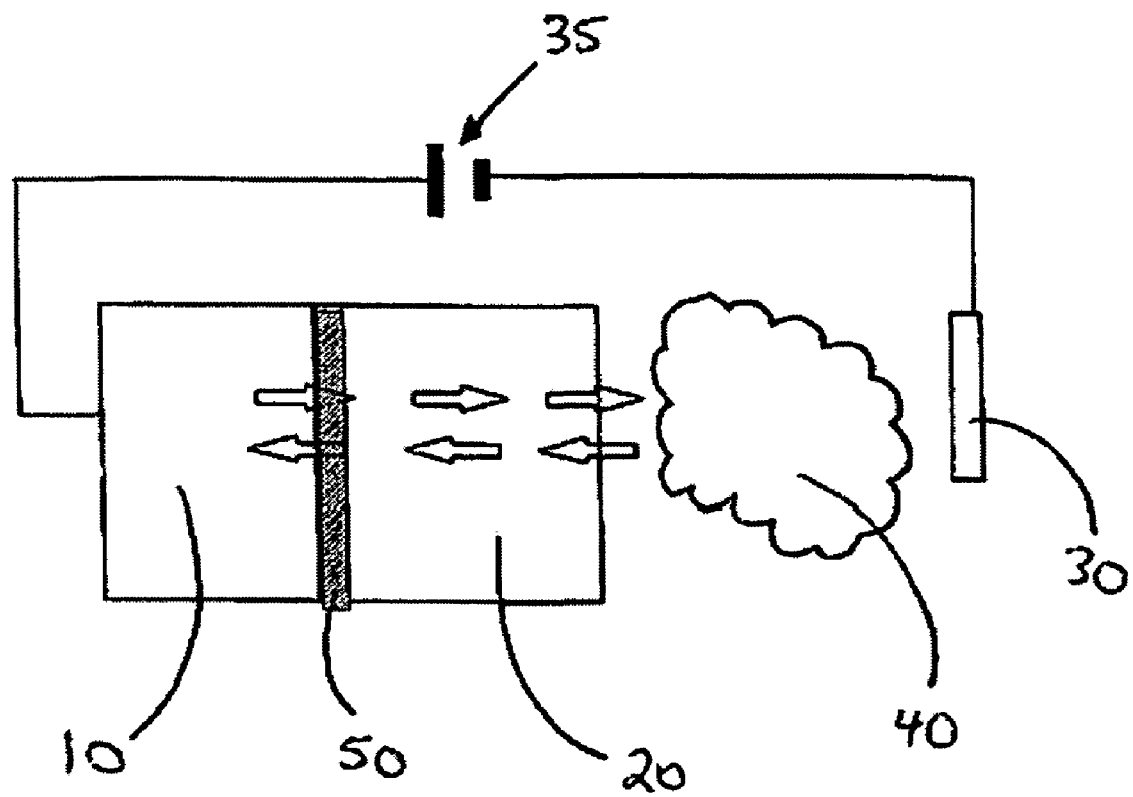
FIG. 1 is a schematic representation of a plasma nitriding process according to one embodiment of the present invention.

The present invention relates to a valve metal material, including a valve metal, at least one nitride layer located on the valve metal, and at least one oxide layer located on the nitride layer. The present invention also relates to a method of forming such a valve metal material. The method can include forming an oxide layer onto the valve metal and then forming a nitride layer between the oxide layer and the valve metal.

For purposes of the present invention, the starting valve metal or base valve metal or valve metals generally include tantalum, niobium, and alloys thereof, and also may include metals of Groups IVB, VB, and VIB, and aluminum and copper, and alloys thereof. Valve metals are described, for example, by Diggle, in "Oxides and Oxide Films," Vol. 1, pp. 94-95, 1972, Marcel Dekker, Inc., New York, incorporated in its entirety by reference herein. Valve metals are generally extracted from their ores and formed into powders by processes that include chemical reduction, as described for example, in U.S. Pat. No. 6,348,113, by a primary metal processor. The valve metal used in the present invention can be formed by the chemical reduction, for instance, of potassium tantalum fluoride salt by metallic sodium, followed by treatment with acid, washing with water, and drying. The dried tantalum base material at this stage is generally referred to as sodium-reduced powder. In an alternative method, base materials are produced from an ingot, for instance, of tantalum by hydrating the ingot, and crushing the ingot into powder of desired sizes. The powder is further degassed in vacuum to remove hydrogen. The powder generated is generally referred to as ingot-derived powder. The valve metal powder can be any powder, such as particle, granule, fibrous, flake, angular, nodular, coral, and mixtures or variations thereof.

The valve metal powders can also be further milled to increase their surface area. Flakes can be characterized as flat, plate shaped, lace, and/or platelet. Examples of tantalum powders, including flakes, are described in U.S. Pat. Nos. 6,348,113 B1; 5,580,367; 5,580,516; 5,448,447; 5,261,942; 5,242,481; 5,211,741; 4,940,490; and 4,441,927, which are incorporated herein in their entireties by reference. Examples of niobium powders are described in U.S. Pat. Nos. 6,420,043 B1; 6,402,066 B1; 6,375,704 B1; and 6,165, 623, which are incorporated herein in their entireties by reference. Other metal flakes, methods for making metal flakes, and uses for metal flakes are set forth in the following U.S. patents, each of which is incorporated herein in its entirety by reference: U.S. Pat. Nos. 4,684,399; 5,261,942; 5,211,741; 4,940,490; 5,448,447; 5,580,516; 5,580,367; 3,779,717; 4,441,927; 4,555,268; 5,217,526; 5,306,462; 5,242,481; and 5,245,514.

Further metal processing techniques typically performed by a primary metal processor include thermally agglomerating the valve metal powder, deoxidizing the agglomerated valve metal powder in the presence of a getter material, and then leaching the deoxidized valve metal powder in an acid leached solution, as disclosed, for example, in U.S. Pat. Nos. 6,312,642, and 5,993,513, incorporated herein in their entireties by reference. The valve metal of the present invention can be powder that is agglomerated, non-agglomerated, or combinations thereof. The valve metal can also be formed into a pressed body, for example, an anode or slug, sintered, anodized, formed into a capacitor, or any combination thereof, as described, for example, in J. Gill, "Basic Tantalum Capacitor Technology," which is incorporated herein in its entirety by reference. For purposes of the present invention, valve metal can include all of the above-mentioned valve metal forms, including sodium-reduced, ingot-derived, flake morphologies, and fibrous powders, as well as pressed, anode, sintered, anodized, and capacitor bodies.

As to forming an oxide layer on the valve metal, the oxide layer can be formed at any point in the production or processing of the valve metal, and can be formed by any active or passive process. For example, the valve metal can gain an oxide layer due to surface reaction with air under ambient or other conditions. Tantalum, for example, rapidly forms a tantalum oxide layer upon exposure to an oxygen environment. The oxygen content in the tantalum metal under this circumstance is proportional to the exposed surface area of the valve metal. In addition, an oxide layer can be formed or grown on the valve metal, for instance, by anodic oxidation. Electrochemically anodizing the valve metal to produce a dielectric layer, e.g., tantalum pentoxide or niobium pentoxide, can be achieved by any method, including exposing the valve metal to phosphoric acid. Other dilute acid solutions known in the art can be used, such as aqueous sulfuric acid, and nitric acid solutions. The thickness of the anodic oxide layer can be any thickness, and further can be controlled by controlling the formation voltage used in the anodization process. The thickness of the anodic oxide layer is defined by both an inward portion and an outward portion grown into and onto the surface of the valve metal, respectively, the inward portion of the dioxide layer defining an interface between the dioxide layer and the valve metal.

As to forming the nitride layer, the nitride layer is preferably formed between the oxide layer and the valve metal. The nitride layer is preferably formed as a continuous nitride film at the interface between the dioxide layer and the valve metal. In one embodiment of the present invention, the nitride layer is a stabilizing layer or blocking layer in a valve metal material at the interface between the dioxide layer and the valve metal. The nitride layer can be formed by diffusing nitrogen atoms through the oxide layer to the interface between the dioxide layer and the valve metal. The nitrogen atoms can combine with nitride forming elements (e.g., tantalum, niobium, etc.) in the region of the interface to form an alloy nitride or diffused layer or stabilizing layer or blocking layer or nitride layer (e.g., tantalum nitride or niobium nitride).

Preferably, the nitriding process is plasma diffusion or ion nitriding or glow discharge or plasma nitriding the valve metal having the oxide layer. Plasma nitriding can be achieved by any plasma nitriding process such as low pressure nitriding and bias-free nitriding. Plasma nitriding can be achieved substantially as described in U.S. Pat. No. 6,473,960 B1 (Schwartz et al.), incorporated herein in its entirety by reference. For example, the nitriding process can be achieved by positioning the valve metal having the oxide layer in a vacuum chamber and between two electrodes, such as an anode and a cathode. Alternatively, the chamber may serve as one electrode, such as the cathode, and the valve metal having the oxide layer can serve as the other electrode, such as the anode. The chamber can then be filled with a nitrogen gas or nitrogen gas mixture, which may include additional gases such as hydrogen, methane, and/or argon. A voltage potential can then be applied to the electrodes such that an arc is created between the electrodes. The arc provides the necessary energy to ionize $N_2$ and enable nitrogen to diffuse into the oxide layer, thereby forming a nitride alloy. The plasma nitriding process can be carried out at any temperature, such as a temperature of from about 20° C. to about 700° C. or higher (e.g., from about 200° C. to about 700° C.). The plasma nitriding process can be carried out under a pressure of about 1 to about 2 Torr. The plasma nitriding process can be carried out at a voltage of about 300 V or less. The plasma nitriding process can be carried out for a time of from about 5 minutes to about 12 hours. Other temperatures, pressures, and/or voltages can be used. Plasma nitriding is preferably achieved by plasma nitriding in a plasma nitriding reactor, commercially available, for example, from Northeast Coating Technologies.

According to one embodiment as shown in FIG. 1, for example, plasma nitriding is achieved by providing the valve metal 10 having the oxide layer 20 in a vacuum chamber and evacuating the chamber to a desired vacuum pressure. Upon reaching the desired vacuum, process gases such as nitrogen, hydrogen and methane are preferably introduced into the chamber and ionized by a voltage applied to the valve metal 10 having the oxide layer 20 using a power supply 35 and a cathode 30. The plasma 40 generated by the ionization preferably envelops the surface of the valve metal 10 having the oxide layer 20 with a glow discharge. The combination of the heat and energy of the plasma 40 causes the nitrogen ions to diffuse through the oxide layer 20 (as indicated by lower arrows) and nitride forming elements, tantalum ions, for example, to migrate in the direction of the oxide layer 20 (as indicated by upper arrows), and react within the valve metal 10. As the process gases react with the nitride forming elements in the valve metal 10, a blocking layer 50 is formed. Preferably, the blocking layer 50 is a nitride alloy. The plasma nitriding is continued for a sufficient time to form a blocking layer 50 of a desired thickness. The blocking layer 50 preferably has a thickness of 0.1 nm to 0.5 nm, and more preferably from about 1 to about 10 nm or more.

In one embodiment of the present invention, the valve metal includes tantalum, the nitride layer comprises tantalum nitride, and the oxide layer comprises tantalum pentoxide. In another embodiment, the valve metal includes niobium, the nitride layer comprises niobium nitride, and the oxide layer comprises niobium pentoxide.

According to one embodiment of the present invention, the valve metal material having a blocking layer is used to form a capacitor. The capacitor can be formed by any method, for example, as described in U.S. Pat. Nos. 6,527,937; 6,462,934; 6,420,043 B1; 6,375,704 B1; 6,338,816 B1; 6,051,044; 5,580,367; 5,448,447; 5,217,526; 5,211,741; and 4,940,490, all of which are incorporated herein in their entireties by reference. It is believed that capacitors made from the valve metal material having a blocking layer according to the present invention have improved electrical leakage characteristics.

At normal capacitor application temperatures (ambient to 100° C.), nitrogen as tantalum nitride, for example, having low mobility in the tantalum matrix, tends to limit movement of oxygen with respect to the dielectric layer. This can prevent the formation of a semiconducting sub-oxide layer that would have a higher electrical leakage than the amorphous tantalum pentoxide layer. Therefore, the presence of a nitride blocking layer in the valve metal material can result in lower electrical leakage in the capacitor. Plasma nitriding according to the present invention results in the formation of a nitride blocking layer at the valve metal/oxide layer interface. Conventional gas nitriding processes on the other hand, result in diffusion of nitrogen throughout the oxide layer such that no discernable continuous nitride blocking layer is formed.

Other embodiments of the present invention will be apparent to those skilled in the art from consideration of the present specification and practice of the present invention disclosed herein. It is intended that the present specification and examples be considered as exemplary only with a true scope and spirit of the invention being indicated by the following claims and equivalents thereof.

What is claimed is:

1. A method of forming a nitride blocking layer in a valve metal material, comprising plasma nitriding said valve metal material, wherein said plasma nitriding diffuses nitrogen atoms through an oxide layer present on said valve metal material to form a nitride layer located between said valve metal material and said oxide layer.

2. The method of claim 1, wherein said valve metal material comprises tantalum metal and said nitride blocking layer comprises tantalum nitride.

3. The method of claim 1, wherein said valve metal material comprises niobium metal and said nitride blocking layer comprises niobium nitride.

4. The method of claim 1, wherein said plasma nitriding is in the presence of a plasma comprising a nitrogen source.

5. The method of claim 1, wherein said plasma nitriding occurs at a temperature from about 20° C. to about 700° C.

6. The method of claim 1, wherein said plasma nitriding occurs under a pressure of about 1 to about 2 Torr.

7. The method of claim 1, wherein said plasma nitriding occurs at a voltage of about 300 V or less.

8. The method of claim 1, wherein said valve metal material is formed from powder.

9. The method of claim 1, wherein said valve metal material is an anode or a pressed body or a sintered body.

10. The method of claim 1, wherein said plasma nitriding forms a nitride layer of at least about 0.1 nm thick.

11. The method of claim 1, wherein said valve metal material is tantalum, said nitride layer comprises tantalum nitride, and said oxide layer comprises tantalum pentoxide.

12. The method of claim 1, wherein said valve metal material is niobium, said nitride layer comprises niobium nitride, and said oxide layer comprises niobium pentoxide.

13. The method of claim 11, wherein said valve metal material is an anode or a pressed body or a sintered body.

14. The method of claim 12, wherein said valve metal material is an anode or a pressed body or a sintered body.

* * * * *